March 5, 1968   L. F. BLATT   3,371,923
MOUNT FOR CYLINDER OPERATED POWER CLAMP
Filed Aug. 17, 1965
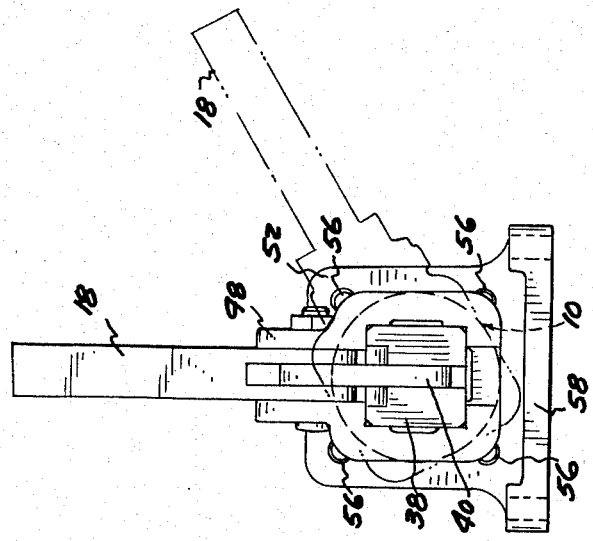
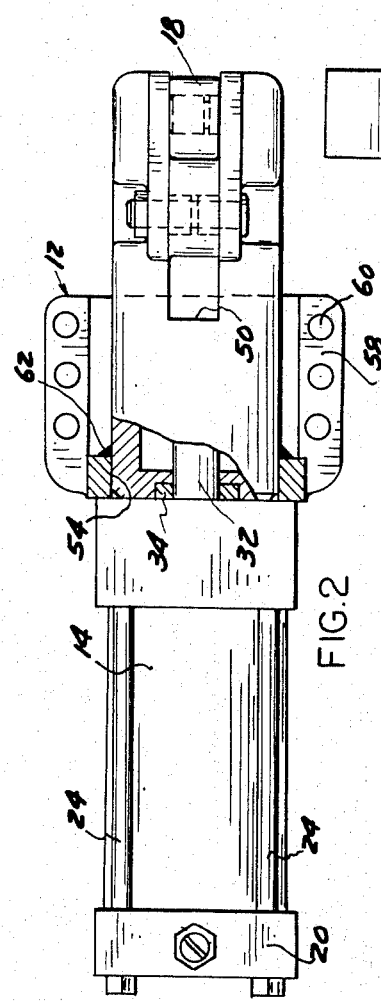
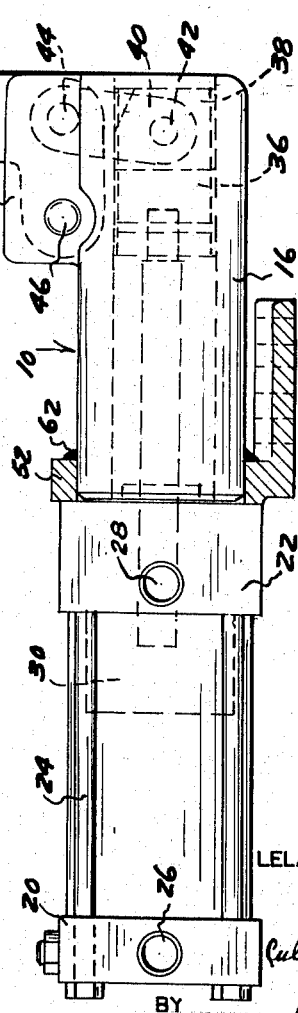
INVENTOR
LELAND F. BLATT
BY   ATTORNEYS

United States Patent Office 3,371,923
Patented Mar. 5, 1968

3,371,923
MOUNT FOR CYLINDER OPERATED
POWER CLAMP
Leland F. Blatt, Grosse Pointe Woods, Mich.
(24121 Mound Road, Warren, Mich. 48091)
Filed Aug. 17, 1965, Ser. No. 480,372
4 Claims. (Cl. 269—32)

ABSTRACT OF THE DISCLOSURE

A cylinder operated power clamp system and a mounting means therefor, the system including aligned first and second cylinders with their respective pistons interconnected, and a clamp actuated by said pistons; a mounting means including a base leg and an upright mounting leg, the latter having a bore receiving and supporting one cylinder, and a plurality of threaded holes to receive tie rods to secure the other cylinder thereto; said cylinders adapted for independent angular adjustment relative to said mounting leg.

---

This invention relates to cylinder operated power clamps, and more particularly, to improved mounting systems for such clamps.

Power clamps are frequently used to secure a work piece to a machine or fixture while a drilling, cutting, welding operation or the like is being performed on such work piece. The configuration of such machines or fixtures varies greatly. There is accordingly considerable variation in the relative location of the clamped work piece and available mounting surface for the power clamps.

It is an object of this invention to provide a mounting arrangement which will provide a rigid support for a cylinder operated power clamp.

It is another object of this invention to provide a mounting arrangement which will accommodate a variety of cylinder sizes.

It is a further object of this invention to provide a mounting arrangement for cylinder operated power clamps which will provide flexibility in the positioning of the power clamp relative to a supporting surface.

Other objects, advantages, and novel features of this invention will become apparent from the following specification when considered in conjunction with the accompanying drawing, wherein:

FIG. 1 is a side elevation of the power clamp and mounting bracket of this invention.

FIG. 2 is a plan view of the device shown in FIG. 1.

FIG. 3 is an end view of the device shown in FIG. 1.

Referring now to the drawings, a cylinder operated power clamp 10 is supported in a mounting bracket 12. The power clamp 10 generally consists of an actuating cylinder 14, a guide cylinder 16, and a clamping arm 18 which is actuated by the cylinders. The clamping arm 18 has been illustrated without any particular fixture secured to its end, it being understood that the particular application of the power clamp does not form a part of this invention.

The actuating cylinder 14 comprises a cylinder confined between a pair of cylinder heads 20 and 22, the heads being secured together by means of a plurality of tie rods 24. A pair of ports 26 and 28 in the heads provide communication between the cylinder and a pneumatic or hydraulic actuating system. Within actuating cylinder 14 there is reciprocally mounted a piston 30 having secured thereto a piston rod 32. Rod 32 projects beyond cylinder 14 through packing 34 into guide cylinder 16 where it is rigidly secured to piston 36. Piston 36 reciprocates within the guide cylinder 16 and has secured thereto a clevis 38. A connecting link 40 transmits the reciprocal motion of piston 36 to clamping arm 18, link 40 being secured to clevis 38 and arm 18 by means of pivot pins 42 and 44. Clamping arm 18 pivots on pin 46 which is mounted between a pair of bosses 48 projecting upwardly from the body of guide cylinder 16. The right hand portion of guide cylinder 16 is bifurcated to form slot 50 so that clamping arm 18 has clearance for its motion.

Turning now to the mounting bracket 12, this bracket is generally L-shaped, having an upstanding leg 52 and a base leg 58. Leg 52 has a bore 54 passing therethrough to accommodate the outside diameter of guide cylinder 16. A plurality of threaded holes 56 are placed in the leg 52 to receive the threaded end portions of tie rods 24 whereby the actuating cylinder 14 may be secured to and supported by mounting bracket 12 in any one of four angular positions. Base leg 58 of mounting bracket 12 has a plurality of bolt holes 60 to accommodate mounting bolts by which the bracket and power clamp assembly may be secured to a mounting surface on a machine or fixture.

The power clamp and mounting bracket are customarily shipped by the supplier to the customer with the guide cylinder 16 inserted within bore 54 of the mounting bracket but not permanently secured therein. In this way, the customer may mount this assembly in the best available fashion, taking into consideration the relative position of available mounting surfaces and the position of the work piece in the machine or fixtures. After securing the mounting bracket to the supporting surface, the customer may then rotate the guide cylinder 16 within bore 54 until the clamping arm 18 is in the desired angular position. Once this position has been established, the guide cylinder 16 may then be welded at 62 to the upstanding leg 52 of the mounting bracket.

The customer thus has the desired flexibility in positioning the clamping arm relative to any available mounting system. This desired flexibility is achieved without any sacrifice in alignment accuracy between the two cylinders. Accurate alignment is provided by the bored hole 54 in the upstanding leg 52 of the bracket.

Mounting bracket 12 has its base horizontal in FIGURE 1 for securing to a support. Said base may be reversed or mounted upon a support in any desired position, such as, for illustration, vertical.

A further feature of this mounting arrangement is that a single bracket can be used to mount a wide range of guide cylinder sizes, provided that there is a portion at the left end of each guide cylinder having an outside diameter which can be snugly inserted into bore 54 of upstanding leg 52.

This invention may be developed within the scope of the following claims. It is to be understood, therefore, that the above description is illustrative of only a single embodiment of this invention, and the invention is not to be interpreted as strictly limited to such embodiment.

I now claim:

1. In a cylinder operated power clamp system characterized by a first cylinder, a first piston reciprocable in said first cylinder, actuating means for reciprocating said first piston, a second cylinder having one open end and one closed end and axially aligned with said first cylinder, a second piston reciprocable in said second cylinder, a rod fixed to said first and second pistons and concentric with said first and second cylinders, and clamp means connected to and actuated by said rod, the improved mounting means for securing the clamping system to a support which comprises:

an L-shaped bracket having a base leg and a mounting leg perpendicular to said base leg;

said mounting leg having a hole bored therethrough and snugly receiving the closed end of said second cylinder;

said mounting leg further having a plurality of threaded holes passing therethrough threadedly receiving a plurality of threaded tie rods secured to said first cylinder;

said base member having a plurality of mounting holes for receiving threaded elements whereby said bracket may be secured to the support;

whereby said bracket rigidly supports and locates said first and second cylinders in axially aligned relationship, and said second cylinder may be rotatably adjusted in said bored hole to any desired angular position relative to said mounting members.

2. A cylinder operated power clamp system, comprising a first cylinder, a first piston reciprocable in said first cylinder, actuating means for reciprocating said first piston, a second cylinder axially aligned with said first cylinder, a second piston reciprocable in said second cylinder, a rod fixed to said first and second pistons and concentric with said first and second cylinders, and clamp means connected to and actuated by said rod, and improved mounting means for securing the clamping system to a support which comprises:

a mounting bracket having a base portion and an upstanding portion, said upstanding portion having first and second faces on opposite sides thereof;

said upstanding portion having means by which said first cylinder is secured to one of said faces, said means permitting said first cylinder to be secured to said mounting bracket in any one of a plurality of angular positions with respect to said base portion;

said upstanding portion snugly surrounding said second cylinder by which said second cylinder is axially aligned with said first cylinder;

and permitting said second cylinder to be positioned in any angular position with respect to said base portion.

3. The mounting bracket of claim 2 wherein said upstanding portion permits each of said first and second cylinders to be secured to either of its first and second faces.

4. The mounting bracket of claim 3 wherein said upstanding portion is asymmetric with respect to said base portion.

References Cited

UNITED STATES PATENTS

| | | | |
|---|---|---|---|
| 2,461,767 | 2/1949 | Peyton | 248—71 X |
| 3,116,058 | 12/1963 | Blatt | 269—94 X |
| 3,273,878 | 9/1966 | Blatt | 269—32 |

ROBERT C. RIORDON, *Primary Examiner.*

J. F. McKEOWN, *Assistant Examiner.*